(12) United States Patent
Borges et al.

(10) Patent No.: US 11,324,054 B2
(45) Date of Patent: *May 3, 2022

(54) IN-VEHICLE WIRELESS COMMUNICATION

(71) Applicant: Apple Inc., Cupertino, CA (US)

(72) Inventors: Daniel R. Borges, San Francisco, CA (US); Sriram Hariharan, San Jose, CA (US); Matthew L. Semersky, San Jose, CA (US); Michael J. Giles, San Jose, CA (US); Andre M. Boule, San Jose, CA (US); Brian D. Pietsch, Foster City, CA (US); Artiom Shamis, San Jose, CA (US); Ganesha Adkasthala Ganapathi Bata, San Jose, CA (US); Christopher R. Whitney, Mountain View, CA (US); Tanya G. Kancheva, Mountain View, CA (US); Friedrich W. Drees, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/579,655

(22) Filed: Sep. 23, 2019

(65) Prior Publication Data

US 2020/0022192 A1  Jan. 16, 2020

Related U.S. Application Data

(63) Continuation of application No. 15/883,584, filed on Jan. 30, 2018, now Pat. No. 10,425,976, which is a
(Continued)

(51) Int. Cl.
*H04W 76/10* (2018.01)
*H04W 4/80* (2018.01)
(Continued)

(52) U.S. Cl.
CPC ............ *H04W 76/10* (2018.02); *H04L 67/12* (2013.01); *H04W 4/40* (2018.02); *H04W 4/44* (2018.02);
(Continued)

(58) Field of Classification Search
CPC ... H04W 76/10; H04W 12/0431; H04W 4/40; H04W 4/48; H04W 4/44; H04W 4/80;
(Continued)

(56) References Cited

U.S. PATENT DOCUMENTS 9,271,290 B2  2/2016 Pelletier et al.
9,888,501 B2* 2/2018 Borges .................. H04W 4/40
(Continued)

FOREIGN PATENT DOCUMENTS

CN  104093148 A  10/2014
EP  2615869 A1   7/2013
(Continued)

OTHER PUBLICATIONS

PCT Patent Application No. PCT/US2016/016898—International Search Report and Written Opinion dated Jun. 3, 2016.
(Continued)

*Primary Examiner* — Walli Z Butt
(74) *Attorney, Agent, or Firm* — Dickinson Wright RLLP

(57) ABSTRACT

The embodiments set forth herein disclose techniques for enabling a user device to seamlessly establish a secure, high-bandwidth wireless connection with a vehicle accessory system to enable the user device to wirelessly stream user interface (UI) information to the vehicle accessory system. To implement this technique, a lower-bandwidth wireless technology (e.g., Bluetooth) is used as an initial means for establishing a Wi-Fi pairing between the user device and the vehicle accessory system. Wi-Fi parameters associated with a Wi-Fi network provided by the vehicle
(Continued)

accessory system can be communicated to the user device using the lower-bandwidth wireless technology. A secure Wi-Fi connection can then be established between the user device and the vehicle accessory system using the provided Wi-Fi parameters. The embodiments also disclose a technique for enabling the user device to automatically reconnect with the vehicle accessory system in a seamless manner (e.g., when returning to a vehicle).

20 Claims, 9 Drawing Sheets

Related U.S. Application Data continuation of application No. 15/017,523, filed on Feb. 5, 2016, now Pat. No. 9,888,501.

(60) Provisional application No. 62/113,493, filed on Feb. 8, 2015.

(51) Int. Cl.
| | | |
|---|---|---|
| *H04W 4/48* | (2018.01) | |
| *H04W 4/40* | (2018.01) | |
| *H04L 67/12* | (2022.01) | |
| *H04W 12/0431* | (2021.01) | |
| *H04W 4/44* | (2018.01) | |
| *H04W 88/06* | (2009.01) | |
| *H04W 48/08* | (2009.01) | |
| *H04W 84/12* | (2009.01) | |

(52) U.S. Cl.
CPC ............... *H04W 4/48* (2018.02); *H04W 4/80* (2018.02); *H04W 12/0431* (2021.01); *H04W 48/08* (2013.01); *H04W 84/12* (2013.01); *H04W 88/06* (2013.01)

(58) Field of Classification Search
CPC ..... H04W 88/06; H04W 48/08; H04W 84/12; H04L 67/12
See application file for complete search history.

(56) References Cited

U.S. PATENT DOCUMENTS

| | | | |
|---|---|---|---|
| 2009/0034498 A1* | 2/2009 | Banerjea | H04W 76/15 |
| | | | 370/338 |
| 2011/0145863 A1 | 6/2011 | Alsina et al. | |
| 2011/0246891 A1 | 10/2011 | Schubert et al. | |
| 2012/0039248 A1 | 2/2012 | Schneider et al. | |
| 2012/0207032 A1 | 8/2012 | Chen et al. | |
| 2013/0138714 A1* | 5/2013 | Ricci | G02B 27/0101 |
| | | | 709/201 |
| 2013/0288606 A1* | 10/2013 | Kirsch | H04M 1/6091 |
| | | | 455/41.3 |
| 2013/0335300 A1 | 12/2013 | Tajima | |
| 2014/0070932 A1 | 3/2014 | Prasad et al. | |
| 2014/0120829 A1 | 5/2014 | Bhamidipati et al. | |
| 2014/0128049 A1 | 5/2014 | Aoki et al. | |
| 2014/0164322 A1 | 6/2014 | Beaurepaire et al. | |
| 2015/0026312 A1 | 1/2015 | Othmer et al. | |
| 2015/0264514 A1* | 9/2015 | Qi | H04W 76/23 |
| | | | 370/338 |
| 2016/0034238 A1 | 2/2016 | Gerlach et al. | |
| 2016/0234870 A1 | 8/2016 | Borges et al. | |
| 2017/0208637 A1* | 7/2017 | Chen | H04M 1/6091 |
| 2018/0288816 A1 | 10/2018 | Borges et al. | |

FOREIGN PATENT DOCUMENTS

| | | | |
|---|---|---|---|
| EP | 2793491 A1 | 10/2014 | |
| JP | 2010093347 A | 4/2010 | |
| KR | 1020130143098 A | 12/2013 | |
| WO | 2013184110 A1 | 12/2013 | |
| WO | WO-2013184110 A1 * | 12/2013 | ............ H04W 48/14 |

OTHER PUBLICATIONS

European Patent Application No. 16747394.1—Extended European Search Report dated Feb. 15, 2018.
Korean Patent Application No. 10-2017-7022141—Notice of Preliminary Rejection dated Jan. 28, 2019.
European Patent Application No. 20214881.3—Extended European Search Report dated Apr. 13, 2021.

* cited by examiner

400

| FIELD | LENGTH (BYTES) | DESCRIPTION/VALUES |
|---|---|---|
| BSSID | 6 | WI-FI BSSID OF THE WI-FI ACCESS POINT |
| SSID | 32 | SSID OF THE WIRELESS NETWORK |
| SECURITY MODE | 1 | WI-FI SECURITY MODE IN USE:<br>• NONE<br>• WEP<br>• WPA PERSONAL<br>• WPA ENTERPRISE<br>• WPA2 PERSONAL<br>• WPA2 ENTERPRISE<br>• WPA/WPA2 MIXED MODE PERSONAL<br>• WPA/WPA2 MIXED MODE ENTERPRISE |
| WPA2 PSK | 32 | WPA2 PERSONAL PSK USED FOR THE WIRELESS NETWORK |
| OPERATING CHANNEL | 1 | 2.4 GHZ OR 5 GHZ RADIO FREQUENCY CHANNEL WHERE THE VEHICLE ACCESSORY SYSTEM HOSTS THE WI-FI NETWORK |
| BT BD_ADDR | 6 | BLUETOOTH BD ADDR (MAC ADDRESS) OF THE VEHICAL ACCESSORY SYSTEM |

*FIG. 4*

IN-VEHICLE WIRELESS COMMUNICATION

CROSS-REFERENCE TO RELATED APPLICATIONS

The present application is a continuation of U.S. patent application Ser. No. 15/883,584, entitled "IN-VEHICLE WIRELESS COMMUNICATION," filed Jan. 30, 2018, set to issue Sep. 24, 2019 as U.S. Pat. No. 10,425,976, which is a continuation of U.S. patent application Ser. No. 15/017,523, entitled "IN-VEHICLE WIRELESS COMMUNICATION," filed Feb. 5, 2016, issued as U.S. Pat. No. 9,888,501 on Feb. 6, 2018, which claims the benefit of U.S. Provisional Application No. 62/113,493, entitled "IN-VEHICLE WIRELESS COMMUNICATION," filed Feb. 8, 2015, the contents of which are incorporated herein by reference in their entirety for all purposes.

FIELD

The described embodiments set forth general methods and apparatuses for wirelessly coupling a user device with a vehicle accessory system, including to enable a user interface associated with the user device to be displayed on a head unit display of the vehicle accessory system.

SUMMARY

The embodiments described herein set forth methods and apparatuses for enabling a user device to generate a user interface (UI) and wirelessly transfer, e.g., stream, the UI to a head unit display included in a vehicle accessory system. The embodiments set forth herein also disclose techniques for enabling the user device to seamlessly establish, via a secure, low-bandwidth wireless connection (e.g., a Bluetooth® connection), a secure, high-bandwidth wireless connection (e.g., a Wi-Fi connection) with the vehicle accessory system. In turn, the user device can transfer the UI to the head unit via the established secure, high-bandwidth wireless connection. According to this approach, the head unit is configured to display the UI through a display device that is communicatively coupled to the head unit, where the head unit continuously outputs an updated UI to the display unit in accordance with UI information that is provided by the user device. In this manner, the head unit serves as a means for receiving and displaying the UI. In some embodiments, the head unit has a minimal (if any) role in generating content that is displayed within the UI. According to some embodiments, the user device can be configured to include, when generating the UI for display by the head unit, a means (e.g., icons) for accessing only a subset of applications that are managed, or otherwise provided, by the user device. For example, the subset of applications displayed at the head unit can include a messaging application, a phone application, a music application, a radio application, a navigation application, and the like. These and other techniques are described below in greater detail.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 4 illustrates a table that defines example Wi-Fi parameters communicated using an accessory communication protocol, according to some embodiments.

DETAILED DESCRIPTION

Figure 1:
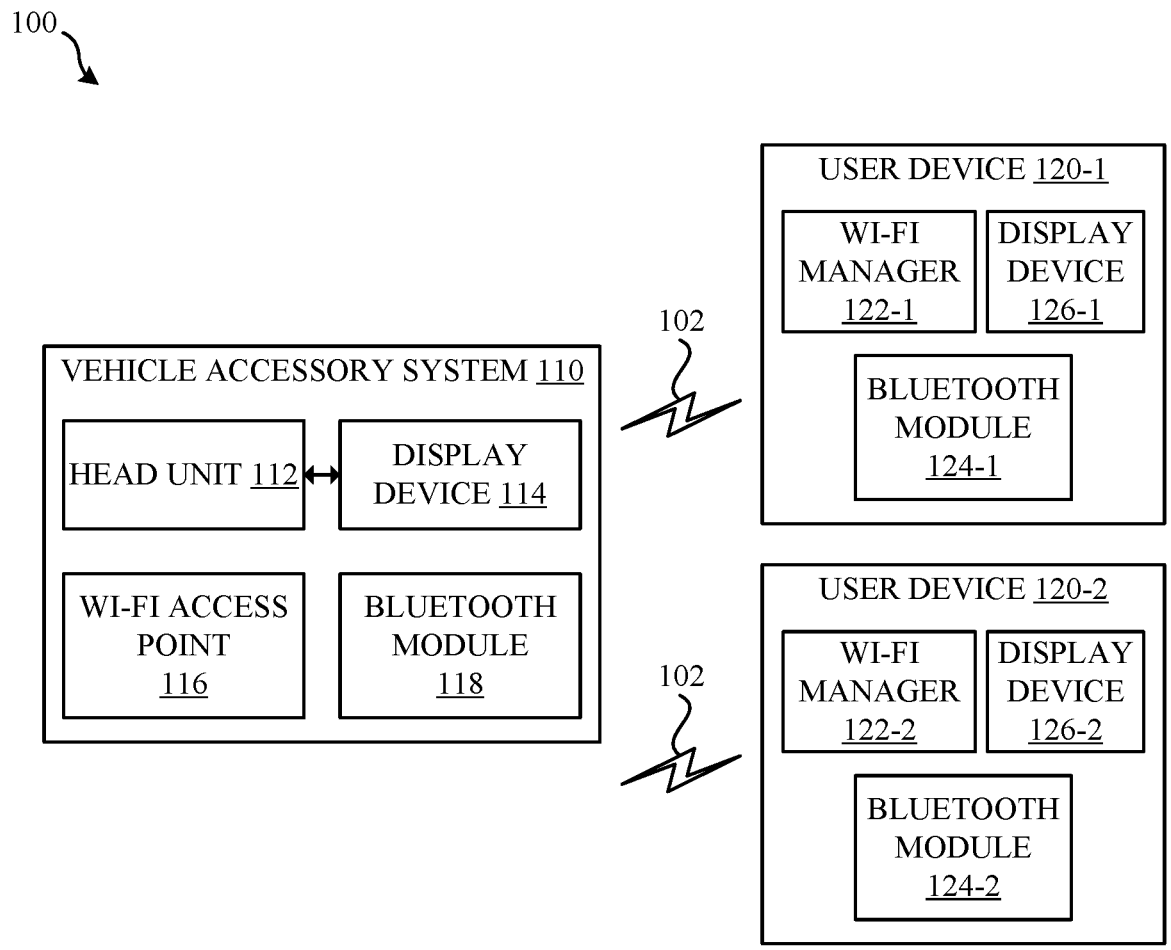
FIG. 1 illustrates a block diagram of different components of an example system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

When implementing wireless UI display techniques, it can be beneficial to utilize wireless communication protocols that provide a level of bandwidth that is commensurate with the resolution and refresh rate of the UI. Notably, these two factors, resolution and refresh rate, have tended to increase over time, as processing speeds and display resolutions advance as new devices are released to the market. Consequently, in some implementations, these advances have rendered some low-bandwidth wireless communication protocols—such as Bluetooth®— insufficient for providing a smooth and reliable wireless transfer of UI information between devices in some implementations.

Thus, it can be desirable to utilize higher-bandwidth wireless communication protocols, such as Wi-Fi, that provide greater bandwidth for implementing the techniques described herein. However, in some circumstances, current Wi-Fi implementations may not provide a simple protocol for establishing a secure connection between two devices in some implementations. As a result, a user can be required to carry out a manual process that involves, for example, establishing, at a vehicle accessory system, a Wi-Fi network name, a Wi-Fi network password, etc., and then subsequently entering corresponding information into his or her user device. Understandably, this can degrade overall user satisfaction, and can further degrade security, as it is unlikely that the user will regularly update his or her Wi-Fi network name/password to thwart potential malicious activity.

Accordingly, the embodiments set forth herein disclose various techniques for enabling a user device to seamlessly establish a secure, high-bandwidth wireless connection with a vehicle accessory system. To implement this technique, a lower-bandwidth (or low-bandwidth) wireless technology (e.g., Bluetooth®) is used as an initial means for establishing a higher-bandwidth (or high-bandwidth) wireless connection (e.g., Wi-Fi) between the user device and the vehicle accessory system. For example, Wi-Fi parameters associated with a Wi-Fi network provided by the vehicle accessory system can be communicated to the user device using the low-bandwidth wireless technology—e.g., via an accessory communication protocol over Bluetooth®. A secure Wi-Fi connection can then be established between the user device and the vehicle accessory system using the Wi-Fi parameters.

Representative embodiments set forth herein also disclose a technique for enabling the user device to automatically (i.e., without user intervention) reconnect with the vehicle accessory system in a seamless manner. More specifically, the user device can utilize the aforementioned low-bandwidth wireless technology in order to 1) facilitate a re-establishment of Wi-Fi connectivity to the vehicle accessory system when the Wi-Fi connection fails or has been terminated, and/or 2) receive updated Wi-Fi parameters from the vehicle accessory system when aspects of the Wi-Fi network provided by the vehicle accessory system change.

Accordingly, the foregoing approaches provide techniques for connecting a user device to a vehicle accessory system, and enabling the user device to wirelessly transmit UI information to the vehicle accessory system. A more detailed discussion of these techniques is set forth below and described in conjunction with FIGS. 1-7, which illustrate detailed diagrams of representative systems and methods that can be used to implement these techniques.

FIG. 1 illustrates a block diagram of different components of a system 100 that is configured to implement the various techniques described herein, according to some embodiments. FIG. 1 illustrates a high-level overview of the system 100, which includes a vehicle accessory system 110 and one or more user devices 120. Each user device 120 can represent any form of a computing device (e.g., smartphones, tablets, laptops, etc.) that is capable of interfacing with other computing devices, such as the vehicle accessory system 110. As shown in FIG. 1, the vehicle accessory system 110 represents a combination of hardware and software components that enable wireless communication sessions, including streaming, to occur between the vehicle accessory system 110 and one or more of the user devices 120. The vehicle accessory system 110 can include a head unit 112 that is communicatively coupled to a display device 114, a Wi-Fi access point 116, and a Bluetooth® module 118, among other components. Similarly, each user device 120 can include a Wi-Fi manager 122, a Bluetooth® module 124, and a display device 126, among other components. The user devices 120 can communicate with the vehicle accessory system 110 via wireless communication links 102 (e.g., over Bluetooth®, Wi-Fi, Near Field Communication (NFC), Long Term Evolution in unlicensed spectrum (LTE-U), and/or other links). It will be appreciated that while FIG. 1 depicts two user devices 120 capable of wirelessly connecting to the vehicle accessory system 110, any number of user devices 120 can be configured to wirelessly communicate with the vehicle accessory system 110 without departing from the scope of the disclosure. Moreover, while the techniques are described herein in terms of Bluetooth® and Wi-Fi connections, the same techniques can be applied to other combinations of wireless connections, in some embodiments, e.g., using a first, low-bandwidth, secure wireless personal area network connection in conjunction with a second high-bandwidth, secure wireless local area network connection. In some embodiments, information from a previous wireless and/or wired connection can be used to assist with establishing a secure high-bandwidth wireless connection between one or more user devices 120 and the vehicle accessory system 110.

Figure 2:
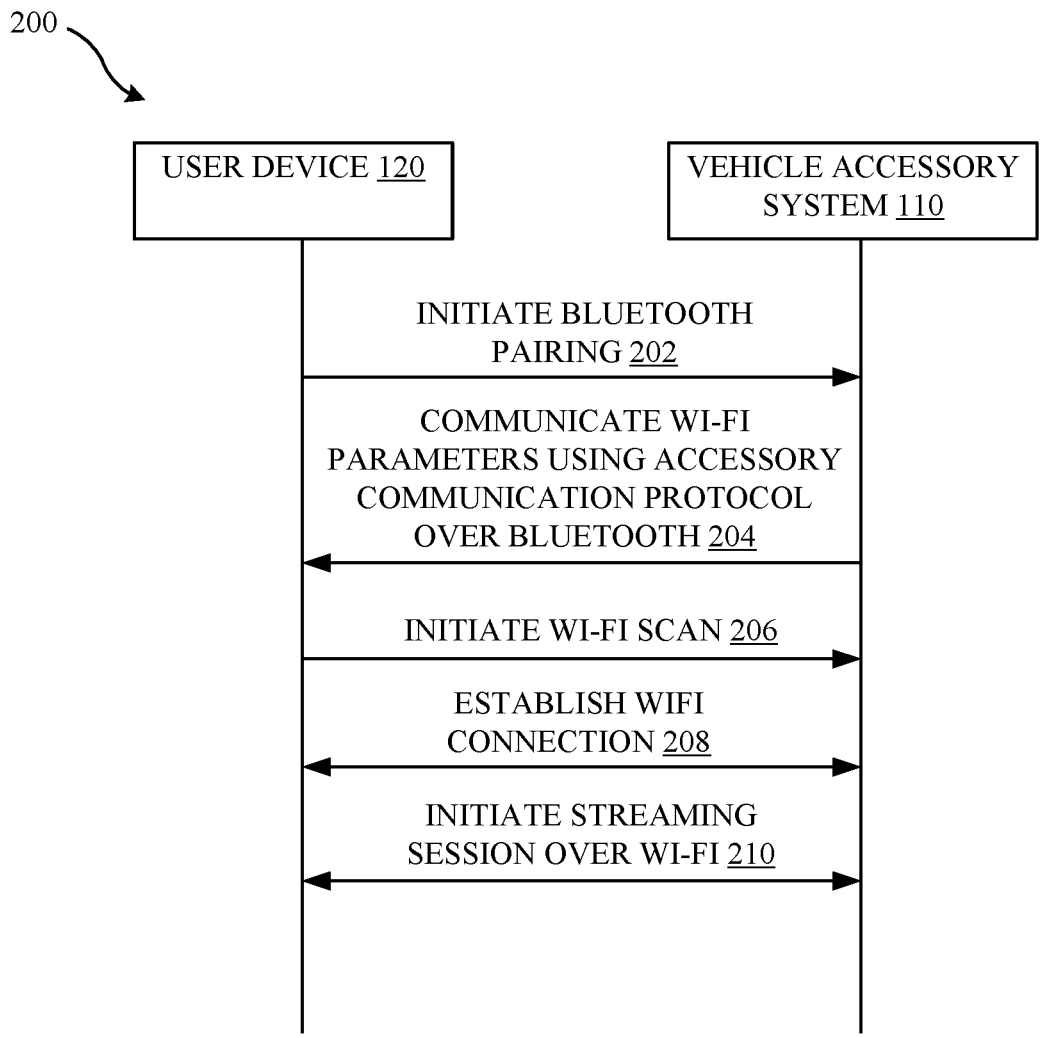
FIG. 2 illustrates a high-level sequence diagram of example operations performed in order to initiate a streaming session between a user device and a vehicle accessory system illustrated in FIG. 1, according to some embodiments.

FIG. 2 illustrates a high-level sequence diagram 200 of operations performed in order to initiate a streaming session between the user device 120 and the vehicle accessory system 110 of FIG. 1, according to some embodiments. As shown in FIG. 2, during an operation 202, the user device 120 initiates a Bluetooth® pairing procedure with the vehicle accessory system 110 (e.g., using the Bluetooth® module 118 in the vehicle accessory system 110 and the Bluetooth® module 124 in the user device 120). When a secure Bluetooth® link is established between the user device 120 and the vehicle accessory system 110, an operation 204 is carried out, where the vehicle accessory system 110 communicates with the user device 120 using, e.g., an accessory communication protocol (ACP) over the Bluetooth® link. The ACP can include, for example, the iOS®-based Accessory Protocol (e.g., iAP2). During the operation 204, the vehicle accessory system 110 communicates, via the ACP to the user device 120, Wi-Fi parameters associated with a Wi-Fi network provided by the vehicle accessory system 110 (e.g., using the Wi-Fi access point 116). In turn, at operation 206, an in-car notification is triggered via the Bluetooth® link, which causes the user device 120—specifically, the Wi-Fi manager 122 included in the user device 120—to scan for the Wi-Fi network provided by the vehicle accessory system 110. In summary, and in accordance with the foregoing steps, a low-bandwidth wireless technology (e.g., Bluetooth®) can be leveraged to provision the user device 120 with Wi-Fi parameters and to initiate a Wi-Fi scan for the Wi-Fi network provided by the vehicle accessory system 110.

At an operation 208, the user device 120 establishes a Wi-Fi connection with the vehicle accessory system 110 using the Wi-Fi parameters received from the vehicle accessory system 110. When the Wi-Fi connection is established, a communication session, e.g., a streaming session, between the user device 120 and the vehicle accessory system 110 can be initiated, which is reflected at the operation 210. According to one example, the streaming session can involve an AirPlay® stream over the Wi-Fi connection. During the streaming session, the user device 120 generates a UI and streams the UI to the head unit 112 via the Wi-Fi connection, where, in turn, the head unit 112 outputs the UI on the display device 114. According to some embodiments, the UI streamed to the head unit can include all information required for displaying the UI or a subset of the information required for displaying the UI. The head unit 112 continuously outputs an updated UI to the display device 114 in accordance with UI information that is received from the user device 120. In this manner, the head unit 112 serves as a means for receiving and displaying the UI. In some implementations, the head unit 112 can play little to no role in generating content that is displayed within the UI.

According to some embodiments, the user device 120 can be configured to include, when generating the UI, only a subset of applications that are managed by the user device 120. For example, the subset of applications displayed on the display device 114 can include a messaging application, a phone application, a music application, a radio application, a navigation application, and the like. In other embodiments, any other set of one or more applications can be presented in any arrangement. In this manner, the display device 114 can display a rendering of the UI, where the rendering includes the subset of the applications managed by the user device 120 that are relevant to, or otherwise selected for, the in-vehicle environment.

Figure 3:
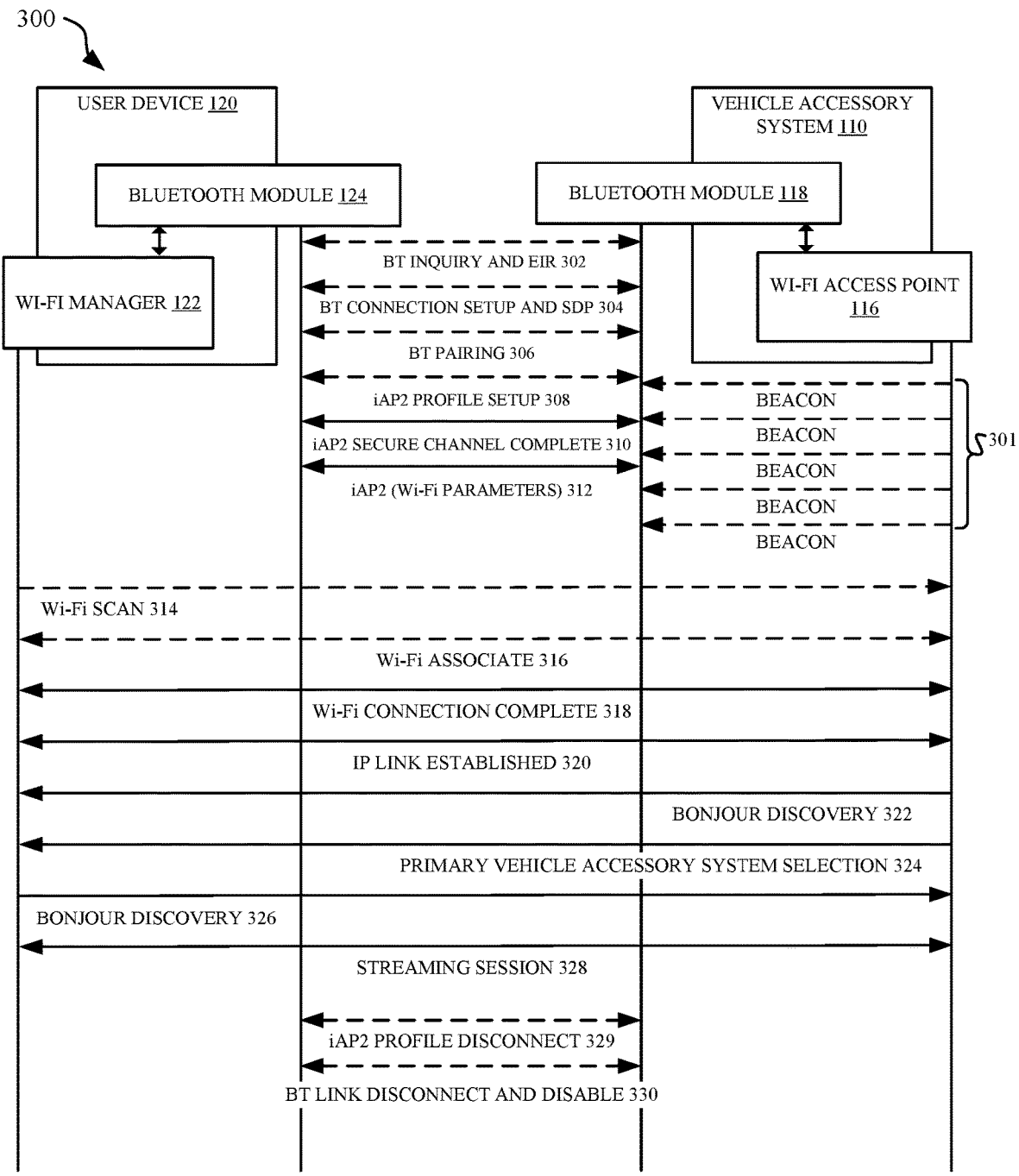
FIG. 3 illustrates an example low-level sequence diagram of the operations of FIG. 2, according to some embodiments.

FIG. 3 illustrates a low-level sequence diagram 300 of a set of operations described above in conjunction with FIG. 2, according to some embodiments. Specifically, the low-level sequence diagram 300 begins with the user device 120 initiating a Bluetooth® pairing procedure with the vehicle accessory system 110. At an operation 302, the user device 120 enters a Bluetooth® inquiry mode to discover devices that support streaming services, e.g., the user device 120 can receive and process beacons 301 produced by the vehicle accessory system 110. According to some embodiments, the vehicle accessory system 110 is configured to carry out periodic scans for inquiries and to respond to an inquiry issued by the user device 120 by sending an Extended Inquiry Response (EIR) packet to the user device 120. The EIR packet can include an indication that the vehicle accessory system 110 supports streaming services. Next, at the operation 304, a Bluetooth® connection setup and service discovery is performed between the user device 120 and the vehicle accessory system 110. The service discovery can be performed via a service discovery protocol (SDP). In turn, a list of devices that support streaming services—which includes the vehicle accessory system 110—is displayed at the user device 120. A selection of the vehicle accessory system 110 (e.g., manually by a user or automatically by the user device 120) causes Bluetooth® pairing to occur between the user device 120 and the vehicle accessory system 110, which is reflected at the operation 306. The Bluetooth® pairing can be performed via Secure Simple Pairing (SSP) using numeric comparison.

In some embodiments, different streams of data (e.g., audio including music and voice calls, video, commands, navigation data, etc.) are provided during the streaming session. Also, when a streaming session is active, audio streams associated with different audio devices (e.g., speaker, headphone, Bluetooth® headset, Wi-Fi, etc.) are switched to Wi-Fi and provided over the Wi-Fi connection. However, in some instances, a particular audio stream may be switched to use a different connection (for example, an incoming call may be switched to a headset via a separate connection) if so desired by the user.

When a secure Bluetooth® link is established between the user device 120 and the vehicle accessory system 110, the user device 120 negotiates and sets up an ACP profile with the vehicle accessory system 110, which is reflected at the operation 308 (and subsequently disconnected at step 329). Next, at operations 310 and 312, an ACP communication channel is established between the user device 120 and the vehicle accessory system 110, and Wi-Fi parameters associated with a Wi-Fi network provided by the vehicle accessory system 110 are communicated by the vehicle accessory system 110 to the user device 120 (via the ACP communication channel). These Wi-Fi parameters can be configured to include any number of parameters and are formatted in a manner that can be understood between the user device 120 and the vehicle accessory system 110. One example set of Wi-Fi parameters is illustrated in FIG. 4, which depicts a table 400 that defines Wi-Fi parameters that can be communicated using ACP over Bluetooth®. As shown in FIG. 4, the Wi-Fi parameters can include a MAC address of the Wi-Fi Access Point 116 (also referred to as BSSID—Basic Service Set Identifier), a network name of the Wi-Fi network (also referred to as SSID—Service Set Identifier), a Wi-Fi security mode being used, a password for the Wi-Fi network (such as, WPA2-PSK—Wi-Fi Protected Access 2 Pre-Shared Key), a channel number being used by the vehicle accessory system 110 (e.g., by Wi-Fi Access Point 116) to host the Wi-Fi network, and a Bluetooth® Address (also referred to as BD-ADDR) of the vehicle accessory system 110. In one embodiment, the Wi-Fi parameters are mapped to the Bluetooth® address of the vehicle accessory system 110.

Referring back now to FIG. 3, at an operation 314, a Wi-Fi scan is triggered at the user device 120 when the user device 120 has successfully received the Wi-Fi parameters from the vehicle accessory system 110. In one embodiment, this involves an in-car notification (of an initial pairing) being triggered through Bluetooth®, which in turn causes the Wi-Fi manager 122 of the user device 120 to scan for the Wi-Fi network. For the scan, information such as a radio frequency channel on which the Wi-Fi access point 116 is operating is exchanged so that directed scans rather than full band scans can be performed, which can promote power savings. As full band scans are also time consuming, latency savings can also be achieved using this approach. In some implementations, information elements can be exchanged, where the information elements can include, among other items, an indication that the vehicle accessory system supports Wi-Fi, an indication of the radio frequency band on which the Wi-Fi access point 116 is operating, an indication of whether both 2.4 GHz and 5 GHz radio frequency bands are supported, an indication of whether internet access is provided, and the like.

In an operation 316, the Wi-Fi Manager 122 associates with the Wi-Fi Access Point 116 located via the scan using the Wi-Fi parameters obtained at the operation 310. When a Wi-Fi connection is successfully established between the user device 120 and the vehicle accessory system 110, an Internet Protocol (IP) link can be established between the user device 120 and the vehicle accessory system 110, which is reflected by the operations 318 and 320. Accordingly, the various foregoing steps can be implemented in order to reduce the amount of user input that otherwise is involved when users are required to manually establish a Wi-Fi connection between the user device 120 and the vehicle accessory system 110.

Further shown in FIG. 3 is a sequence of operations (322, 324, and 326) including a service discovery by the vehicle accessory system 110 using a service discovery protocol (e.g., Bonjour®). Specifically, a selection of (1) a primary vehicle accessory system 110, and (2) a service discovery by the user device 120 is performed prior to initiating a streaming session between the user device 120 and the vehicle accessory system 110. In turn, at the operation 328, the streaming session is performed over the IP link, which involves the user device 120 wirelessly transmitting a UI to the head unit 112 of the vehicle accessory system 110, where the UI is output by the head unit 112 to the display device 114.

At the operation 330, when the streaming session has been successfully initiated between the user device 120 and the vehicle accessory system 110, the Bluetooth® link provided by the Bluetooth® module 118 can either remain in an idle mode or be terminated, depending on a number of factors. For example, the radio frequency band in which the Wi-Fi network operates—e.g., the 2.4 GHz or 5 GHz radio frequency band—can influence the reliability of the Wi-Fi streaming session when the Bluetooth® link remains in an idle mode (instead of being terminated). Specifically, when the Wi-Fi streaming session operates within a 2.4 GHz radio frequency band, interference may occur between the Wi-Fi streaming session and Bluetooth® traffic (from other devices). Thus, it can be beneficial to terminate the Bluetooth® link between the vehicle accessory system 110 and the user device 120 to which the Wi-Fi connection is being used (especially when other Bluetooth® devices are not present). When, however, the Wi-Fi access point 116 operates with a 5 GHz radio frequency band—which does not typically interfere with Bluetooth® traffic—the Bluetooth® module 118 can enter into an idle mode, thereby enabling the Bluetooth® module 118 to remain capable of establishing connections with other Bluetooth® components (e.g., a separate hands-free component).

Accordingly, when a user pairs his or her user device 120 with a vehicle accessory system 110 of a vehicle for a first time, an initial Bluetooth® pairing procedure (operations 302-306) is performed, Wi-Fi parameters are communicated to the user device 120 via the ACP communication channel (operations 308-312), and Wi-Fi pairing and IP link creation is achieved using the Wi-Fi parameters (operations 314-320). Subsequently, when the user re-enters the vehicle (in possession of his or her user device 120) after the initial Bluetooth® pairing is achieved, the user device 120 can automatically—and without user intervention—connect to the vehicle accessory system 110 using the previously-obtained Wi-Fi parameters. This allows a streaming session to be automatically initiated each time the user enters his or her vehicle, which can significantly enhance the user's overall experience.

In some embodiments, the ACP communication channel provides a mechanism for communicating various messages between the vehicle accessory system 110 and user device 120. When a user manipulates any input sources (e.g., jog wheels, touch screens, up/down buttons, steering wheel buttons, etc.) provided in the vehicle, the vehicle accessory system 110 can send appropriate messages/commands to the user device 120 over the ACP communication channel, and vice-versa.

In some embodiments, navigation data (e.g., Global Positioning System (GPS) data) can be shared between the vehicle accessory system 110 and the user device 120. In many cases, the vehicle accessory system 110 includes a GPS unit, and the vehicle accessory system 110 is connected to a robust power source (e.g., a car battery). According to this setup, navigation data can be sent by the vehicle accessory system 110 to the user device 120 over the ACP communication channel. The navigation data can be sent to supplement or replace GPS data normally gathered by the user device 120. Sharing this navigation data from the vehicle accessory system 110 to the user device 120 can benefit the user device 120 by reducing requirements on the user device 120 to perform scans to obtain location information (e.g., in crowded cities), which can degrade the overall performance of the user device 120 in various aspects. Sharing this navigation data from the vehicle accessory system 110 to the user device 120 can also benefit the user device 120 by reducing power consumption at the user device 120, which can extend the battery life of the user device 120. According to some embodiments, the navigation data can be shared between the vehicle accessory system 110 and the user device 120 depending on a communication mode being employed by the user device 120. For example, in some embodiments, when the user device 120 is communicating with the vehicle accessory system 110 over Wi-Fi at 2.4 GHz, navigation data can be shared, whereas navigation data might not be shared when the Wi-Fi is operating at 5 GHz.

Figure 5:
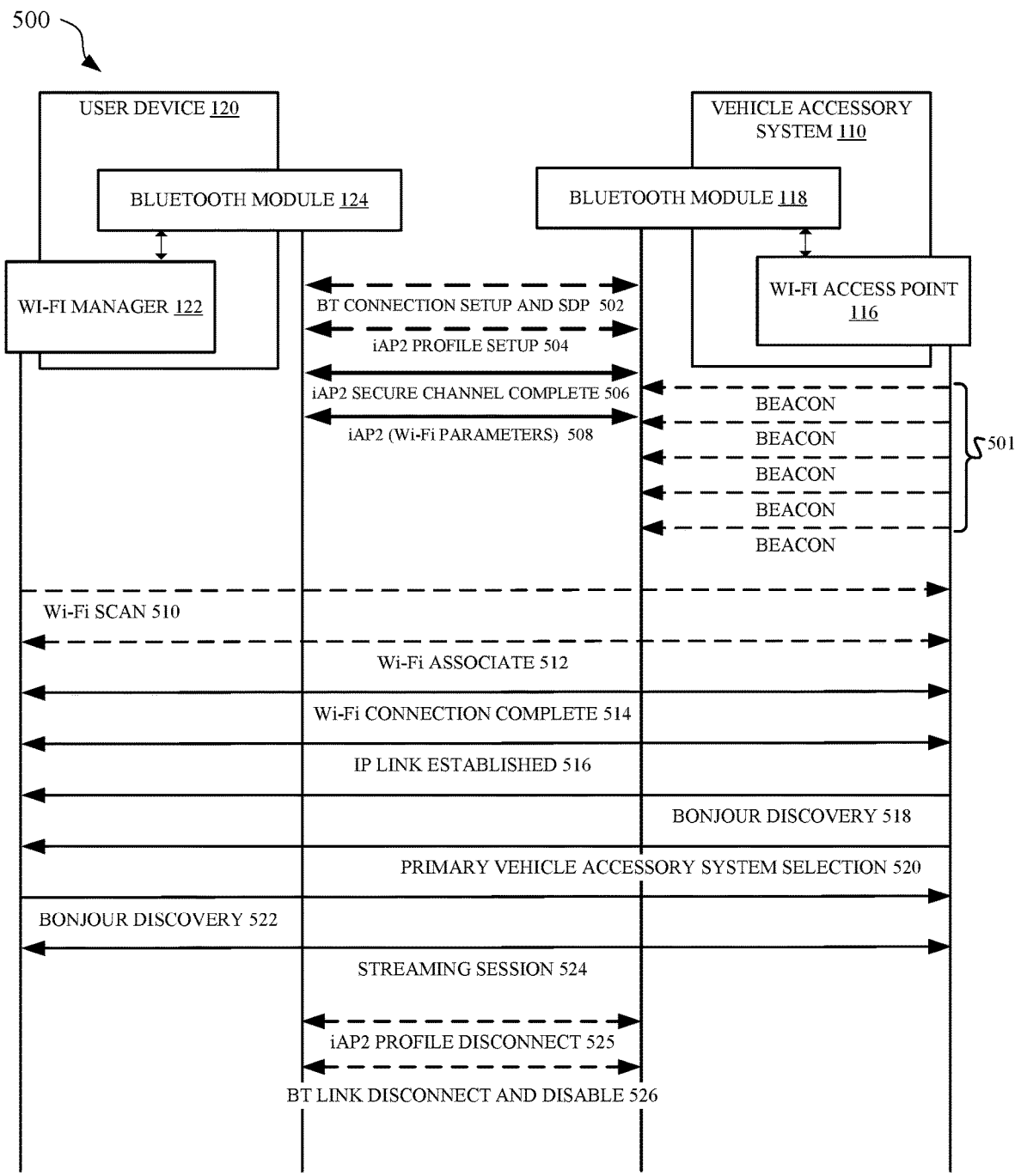
FIG. 5 illustrates an example low-level sequence of operations performed for automatically reconnecting a previously-paired user device with the vehicle accessory system, according to some embodiments.

FIG. 5 illustrates a low-level sequence diagram 500 of operations performed for automatically reconnecting a previously-paired (e.g., a Bluetooth® and Wi-Fi paired) user device 120 with the vehicle accessory system 110, according to some embodiments. For example, the vehicle accessory system 110 can initiate a reconnect procedure with the previously-paired user device 120 when one or more Wi-Fi parameters (for example, a Wi-Fi password) of the Wi-Fi network (provided by the Wi-Fi access point 116) are updated. In the reconnect procedure, various initial Bluetooth® messages (e.g., Bluetooth® inquiry messages) that are communicated during an initial Bluetooth® connection and pairing procedure (illustrated in FIG. 3) do not need to be re-established/re-transferred between the user device 120 and the vehicle accessory system 110. Instead, the Bluetooth® link and ACP communication channel can remain intact, and can be used by the vehicle accessory system 110 to communicate updated Wi-Fi parameters to the user device 120. This is reflected by the operations 502-508 of FIG. 5, where the user device 120 is provisioned with updated Wi-Fi parameters in conjunction with beacons 501 produced by the vehicle accessory system 110.

When the Bluetooth® link is established, and the updated Wi-Fi parameters are provided to the user device 120, the user device 120 attempts to establish a new Wi-Fi connection with the Wi-Fi access point 116 using the updated Wi-Fi parameters (as reflected by the operations 510 and 512). In some embodiments, an in-car notification (of a reconnect) is triggered through the Bluetooth® link, which in turn triggers the Wi-Fi manager 122 of user device 120 to scan for and connect to the Wi-Fi network provided by the Wi-Fi access point 116. The remaining operations 514-526 of FIG. 5, similar to operations 318-330 of FIG. 3, involve re-establishing an IP link and initiating a streaming session between the user device 120 and the vehicle accessory system 110. Notably, the foregoing reconnect procedure can also be initiated by the vehicle accessory system 110 when a Wi-Fi connection is lost between the user device 120 and the vehicle accessory system 110. In this scenario, a Bluetooth® link can be re-established, and the user device 120 can attempt to reconnect to the Wi-Fi access point 116 using the reconnect procedure.

In some embodiments, the vehicle accessory system 110 can be configured to provide explicit "out-of-vehicle" notifications to the user device 120 to prevent the user device 120 from continually (and wastefully) attempting to reconnect to the vehicle accessory system 110. For example, in a first scenario, when the vehicle accessory system 110 powers off (e.g., when the engine of the vehicle is shut down), the vehicle accessory system 110 can issue an "out-of-vehicle" notification, which in turn can cause the user device 120 to terminate the Wi-Fi connection with the vehicle accessory system 110. Notably, as Bluetooth® uses a shorter time window for trying to reestablish a connection (e.g., approximately 300-500 ms) compared to a Wi-Fi connection (e.g., approximately 8 seconds), the Wi-Fi manager 122 of the user device 120 can be triggered to start scanning for a new Wi-Fi network sooner than normal. This can beneficially reduce delays that might otherwise occur when the user device 120 would transition to join another Wi-Fi network (e.g., when the user drives up to his or her residence).

In a second scenario, an explicit "goodbye" notification can be communicated over the ACP communication channel, where the goodbye notification causes the user device 120 to roam to a new Wi-Fi network (e.g., a home network or a work network). Specifically, when the Wi-Fi access point 116 shuts down, the goodbye notification is sent by the vehicle accessory system 110 to the user device 120, which triggers a sequence of events similar to those that occur in response to an out-of-vehicle notification. In a third scenario, the Wi-Fi access point 116 can transmit de-authentication notifications to the user device 120 as the Wi-Fi access point 116 is shutting down, which can also trigger the sequence of events similar to those that occur in response to the out-of-vehicle notification. Thus, any of the first, second, and third scenarios enable the user device 120 to more efficiently connect to a different Wi-Fi network when the Wi-Fi connection to the vehicle accessory system 110 is no longer relevant and/or available.

In some embodiments, the vehicle accessory system 110 can support multiple user devices 120 on the Wi-Fi network/Bluetooth® link. For example, multiple user devices 120 can be supported when the Wi-Fi access point 116 operates using the 5 GHz radio frequency band. Further, the vehicle accessory system 110 can be configured to switch between user devices 120 that are within communication range. For example, the driver and passenger may each operate a different user device 120 (e.g., user devices 120-1 and 120-2) that is capable of communicating with the vehicle accessory system 110. In some embodiments, the driver's device (e.g., user device 120-1) can be selected as a primary (or preferred) user device 120 and the passenger's device (e.g., user device 120-2) can operate as a secondary user device 120. In other embodiments a hierarchy can be established using different criteria or no hierarchy may be established. The vehicle accessory system 110 can switch between primary and secondary user devices 120 based on different functions in use, e.g., when the primary user device 120 is selected to stream a UI to the vehicle accessory system 110. In one instance, the vehicle accessory system 110 can select the secondary user device 120 (e.g., to play music), and can be switched back to the primary user device 120 when desired (e.g., to check navigation).

Upon entry into the vehicle, both the primary and the secondary user devices 120 can advertise to the vehicle accessory system 110 (e.g., via Bonjour®) that they support UI streaming. The primary user device 120 can receive an in-car notification and connect to the Wi-Fi network provided by the vehicle accessory system 110. Subsequently, the secondary user device 120 can receive an in-car notification and also connect to the Wi-Fi network. In some embodiments, a user device 120 selection interface can be presented on display device 114 coupled to head unit 112 to facilitate switching between the primary and secondary user devices 120.

In some embodiments, when the vehicle accessory system 110 supports multiple devices, the vehicle accessory system 110 can attempt to reconnect with one or more (or all) previously paired Bluetooth® devices. In one scenario, the vehicle accessory system 110 may attempt to reconnect to the primary user device 120, but may be unable to do so, e.g., when Wi-Fi is disabled at the primary user device 120. In this case, the vehicle accessory system 110 can attempt to reconnect to the secondary user device when Wi-Fi is turned on at the secondary user device 120. In a second scenario, when both the primary and the secondary user devices 120 have Wi-Fi enabled, the vehicle accessory system 110 can first attempt to reconnect to the primary user device 120 and subsequently successfully connect to the primary user device 120. The vehicle accessory system 110 can then attempt to reconnect to the secondary user device 120 and subsequently connect to the secondary user device 120 as well. The vehicle accessory system 110 can display a user device 120 selection interface, e.g., on the display device 114, to permit selection of either the primary user device 120 or the secondary user device 120 as the active device and to permit switching between them. In some embodiments, both the primary and secondary user devices 120 are capable of connecting wirelessly to the vehicle accessory system 110. In some cases, a particular user device 120 (for example, the secondary user device 120) can connect to the vehicle accessory system 110 in a wired manner (e.g., via a USB interface, via an Ethernet USB interface, etc.). The device discovery, device selection, and initiation of a UI streaming session can be performed in a similar manner regardless of whether the particular device connects to the vehicle accessory system 110 wirelessly or in a wired manner. In some cases, a combination of Bonjour® and one or more application programming interfaces (APIs) can be used for session management (for example, starting/ending the sessions) with multiple user devices 120.

Figure 6A:
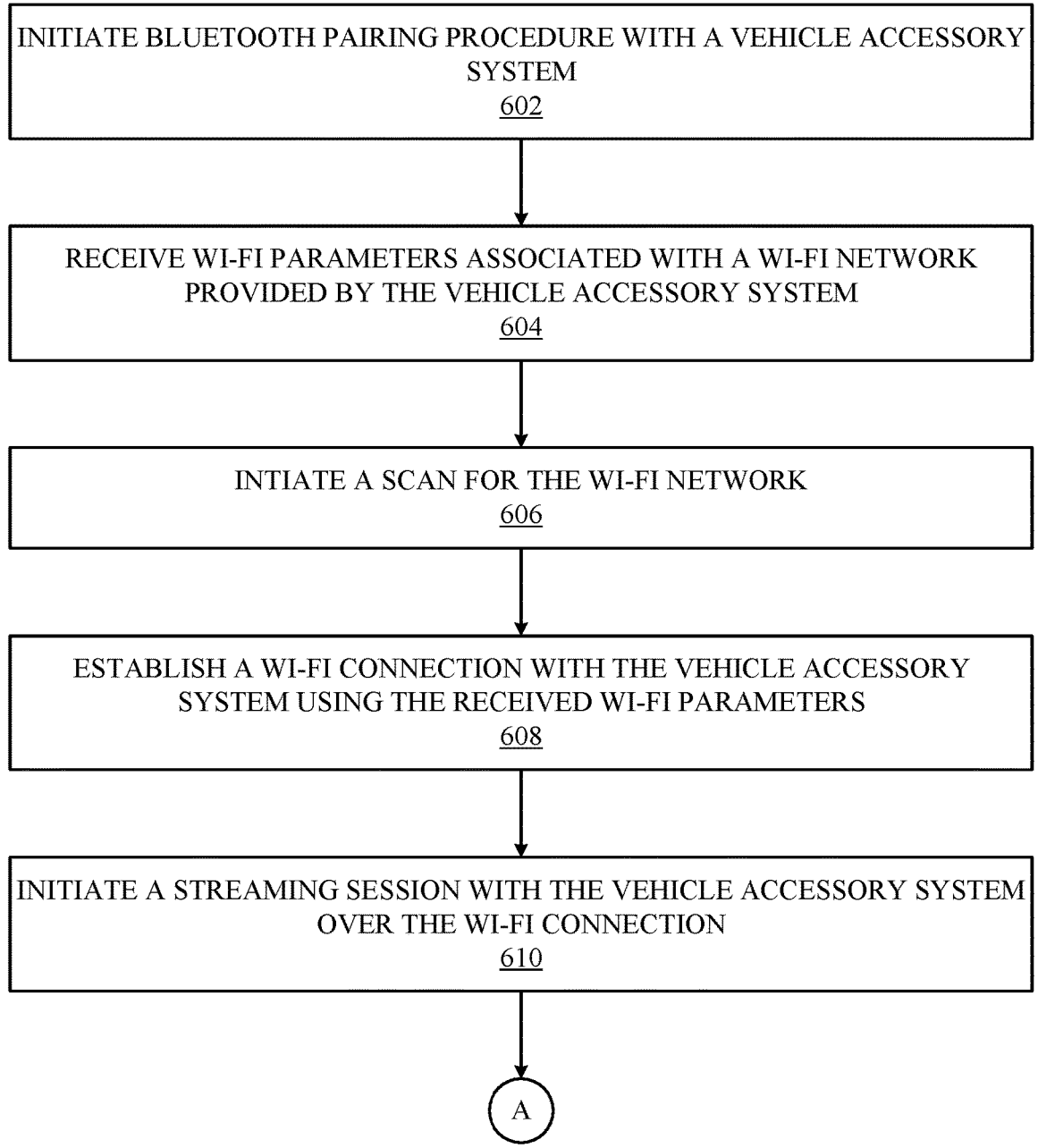
FIGS. 6A and 6B illustrate flowcharts of an example method for initiating and maintaining a streaming session between the user device and the vehicle accessory system, according to some embodiments.
Figure 6B:
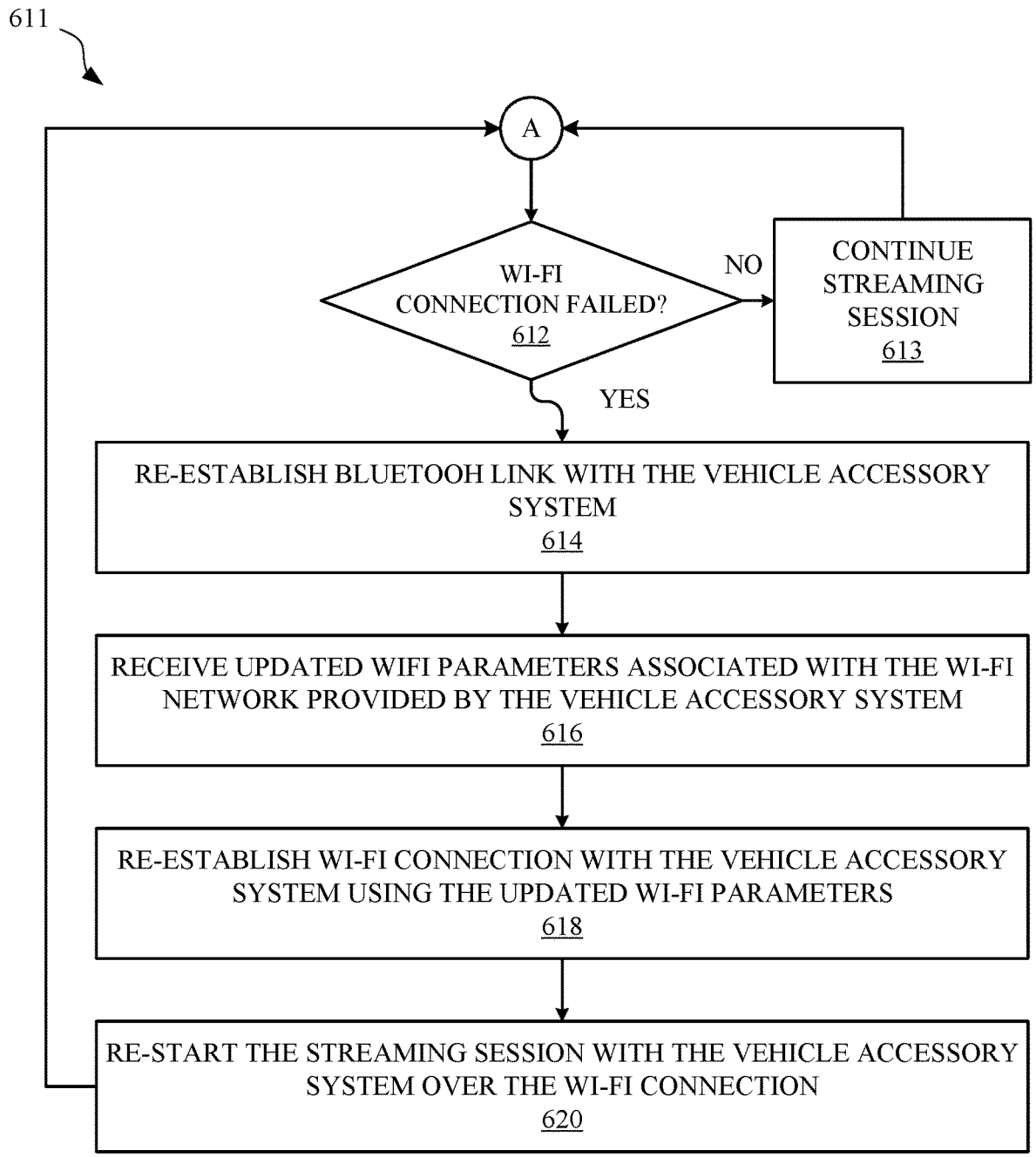

FIGS. 6A-6B illustrate flowcharts 600 and 611 of a method for initiating and maintaining a streaming session between a user device 120 and the vehicle accessory system 110. As shown in FIG. 6A, the method begins at step 602, where the user device 120 initiates a Bluetooth® pairing procedure with the vehicle accessory system 110. As a result of the Bluetooth® pairing, a secure Bluetooth® link is established between the user device 120 and the vehicle accessory system 110. At step 604, the user device 120 receives, from the vehicle accessory system 110, Wi-Fi parameters associated with a Wi-Fi network provided by the vehicle accessory system 110. According to some embodiments, the Wi-Fi parameters are exchanged using ACP over the Bluetooth® link.

At step 606, when the user device 120 successfully receives the Wi-Fi parameters, the user device 120 initiates a scan for the Wi-Fi network provided by the vehicle accessory system 110. As previously noted herein, the scan can be performed in accordance with the provided Wi-Fi parameters to reduce the amount of processing that is involved in identifying the Wi-Fi networked provided by the vehicle accessory system 110. At step 608, the user device 120 establishes a Wi-Fi connection with the vehicle accessory system 110 using the Wi-Fi parameters received from the vehicle accessory system 110. When the Wi-Fi connection is established, at step 610, the UI streaming session between the user device 120 and the vehicle accessory system 110 can be initiated. For the UI streaming session, the user device 120 generates the UI and wirelessly streams the UI to the head unit 112 included in the vehicle accessory system 110 over the Wi-Fi connection, where, in turn, the head unit 112 outputs the UI to the display device 114.

At step 612, which is illustrated in FIG. 6B, the user device 120 determines whether the Wi-Fi connection between the user device 120 and the vehicle accessory system 110 has failed and/or disconnected. In one scenario, the Wi-Fi connection can disconnect when the user device 120 is out of range of the Wi-Fi network provided by the vehicle accessory system 110. In another scenario, the Wi-Fi connection can fail when Wi-Fi parameters associated with the Wi-Fi network are updated, but haven't yet been communicated to the user device 120. In response to a determination that the Wi-Fi connection has not failed/disconnected, at step 613, the user device 120 can continue the streaming session. Conversely, in response to a determination that the Wi-Fi connection has failed/disconnected, at step 614, the user device 120 can re-establish a Bluetooth® connection with the vehicle accessory system 110. According to some embodiments, the user device 120 can receive updated Wi-Fi parameters from the vehicle accessory system 110, which is reflected at step 616. At step 618, the user device 120 can re-establish the Wi-Fi connection with the vehicle accessory system 110 using the updated Wi-Fi parameters. Finally, the streaming session between the user device 120 and the vehicle accessory system 110 can restart, which is reflected at step 620.

In some cases, when a user leaves the vehicle and the user device 120 is out of range, the Wi-Fi connection disconnects. When the Wi-Fi access point 116 operates using the 2.4 GHz radio frequency band, the Bluetooth® connection also may be in a disconnected state, e.g., when the Bluetooth® link was disabled after the Wi-Fi connection was established. In this scenario, when the Wi-Fi connection is disconnected and there are no existing on-going sessions (e.g., with a different user device 120), Bluetooth® can be turned back on at the user device 120. Thus, when the user re-enters the vehicle with his or her user device 120, the reconnect procedure is initiated again over Bluetooth® without user intervention, thereby providing a seamless experience to the user.

Figure 7:
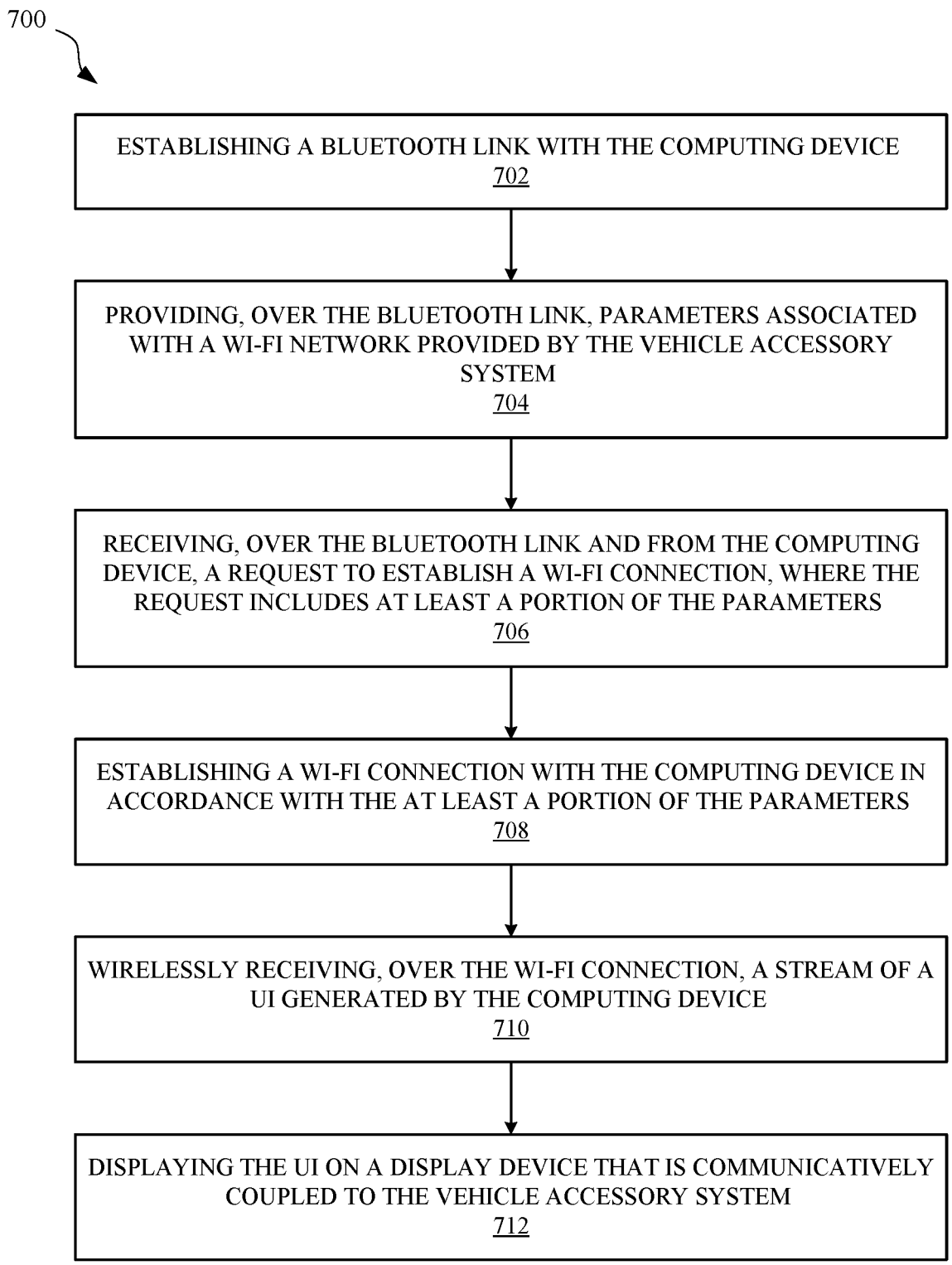
FIG. 7 illustrates a flowchart of a method for initiating and maintaining a streaming session between a vehicle accessory system and a user device, according to some embodiments.

FIG. 7 illustrates a flowchart 700 of a method for initiating and maintaining a streaming session between the vehicle accessory system 110 and a user device 120, according to some embodiments. As shown in FIG. 7, the method begins at step 702, where the vehicle accessory system 110 establishes a Bluetooth® link with the user device 120. At step 704, the vehicle accessory system 110 provides, over the Bluetooth® link, parameters associated with a Wi-Fi network provided by the vehicle accessory system 110. At step 706, the vehicle accessory system 110 receives, over the Bluetooth® link and from the user device 120, a request to establish a Wi-Fi connection, where the request includes at least a portion of the parameters.

At step 708, the vehicle accessory system 110 establishes a Wi-Fi connection with the user device 120. At step 710, the vehicle accessory system 110 wirelessly receives, over the Wi-Fi connection, a stream representing a UI generated by the user device 120. Finally, at step 712, the vehicle accessory system 110 displays the UI on the display device 114 that is communicatively coupled to the vehicle accessory system 110.

Figure 8:
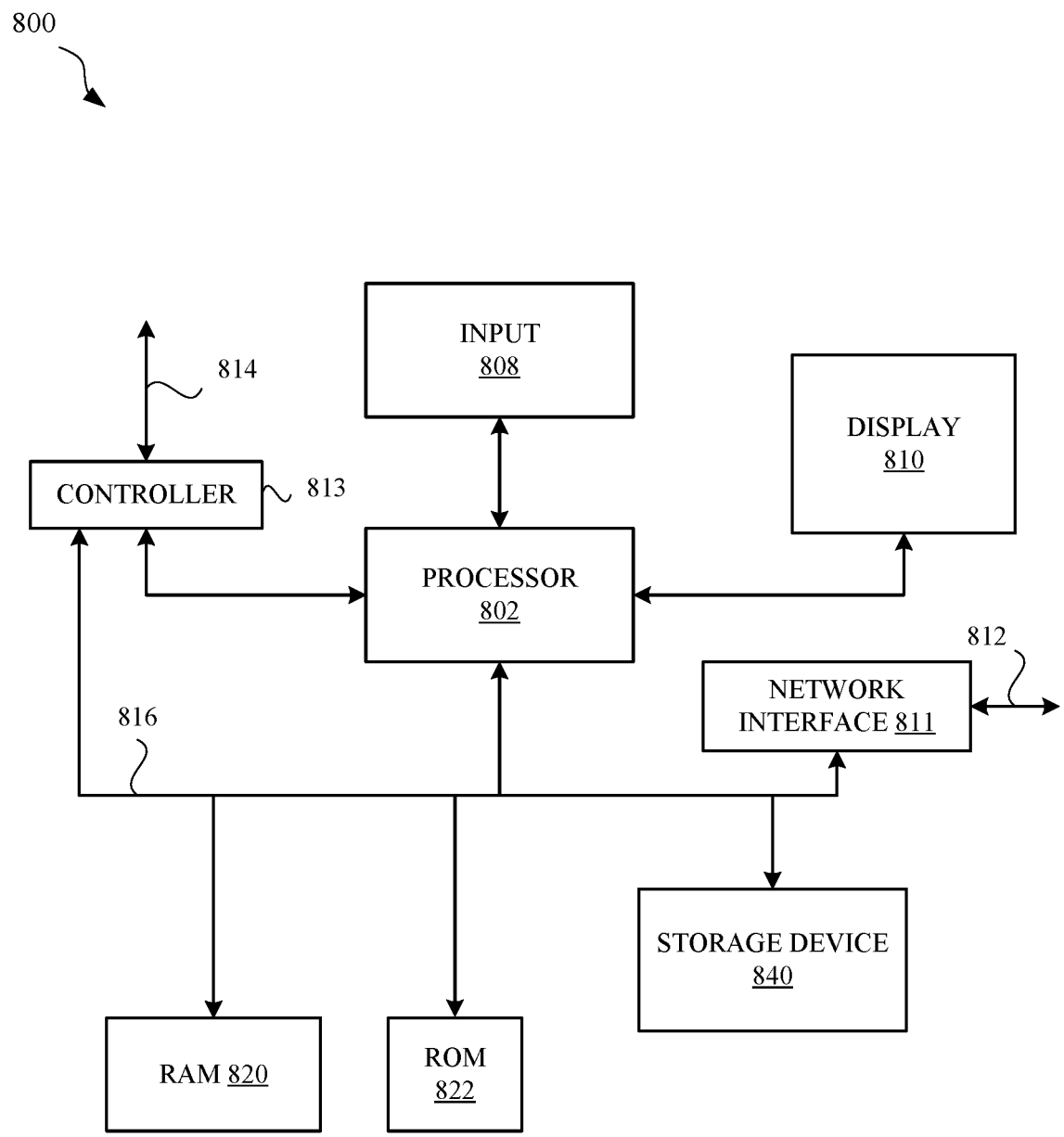
FIG. 8 illustrates a detailed view of a computing device that can be used to implement the various techniques described herein, according to some embodiments.

FIG. 8 illustrates a detailed view of a computing device 800 that can be used to implement the various components described herein, according to some embodiments. In particular, the detailed view illustrates various components that can be included in the vehicle accessory system 110 or the user devices 120 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (e.g., a screen display) that can be controlled by the processor 802 to display information to the user. A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single disk or multiple disks (e.g., hard drives), and includes a storage management module that manages one or more partitions within the storage device 840. In some embodiments, the storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A method for enabling a computing device to communicate with a vehicle accessory system, the method comprising, at the computing device:
   determining that a first connection to a Wi-Fi network provided by the vehicle accessory system using a first set of Wi-Fi parameters failed and/or disconnected;
   establishing a secure Bluetooth connection with the vehicle accessory system;
   receiving, over the secure Bluetooth connection and from the vehicle accessory system, a second set of Wi-Fi parameters associated with the Wi-Fi network;
   establishing a second connection to the Wi-Fi network in accordance with the second set of Wi-Fi parameters; and
   determining whether to maintain the secure Bluetooth connection based at least on a radio frequency band on which the Wi-Fi network operates or a Bluetooth connection between the computing device and a device other than the vehicle accessory system.

2. The method of claim 1, further comprising, in response to detecting that (i) the Wi-Fi network operates using a 2.4 GHz radio frequency band, and (ii) the computing device is not communicating, via Bluetooth, with any other computing device aside from the vehicle accessory system:
   terminating the secure Bluetooth connection.

3. The method of claim 2, further comprising, in response to detecting that the second connection to the Wi-Fi network is inactive:
   initializing the secure Bluetooth connection.

4. The method of claim 1, further comprising, in response to detecting that (i) the Wi-Fi network operates using a 5 GHz radio frequency band, or (ii) the computing device is communicating, via Bluetooth, with another computing device aside from the vehicle accessory system:
   maintaining the secure Bluetooth connection.

5. The method of claim 1, further comprising, subsequent to establishing the second connection to the Wi-Fi network:
   wirelessly streaming, to the vehicle accessory system over the Wi-Fi network, a user interface (UI) that is generated by the computing device, wherein the vehicle accessory system utilizes at least a portion of the UI to generate an output on a display device that is communicably coupled to the vehicle accessory system.

6. The method of claim 5, wherein the UI differs from a primary UI displayed on a second display device that is communicably coupled to the computing device.

7. The method of claim 6, wherein the UI includes at least one icon corresponding to an application hosted on the computing device.

8. At least one non-transitory computer readable storage medium configured to store instructions that, when executed by at least one processor included in a computing device, cause the computing device to communicate with a vehicle accessory system, by carrying out steps that include:
   determining that a first connection to a Wi-Fi network provided by the vehicle accessory system using a first set of Wi-Fi parameters failed and/or disconnected;
   establishing a secure Bluetooth connection with the vehicle accessory system;
   receiving, over the secure Bluetooth connection and from the vehicle accessory system, a second set of Wi-Fi parameters associated with the Wi-Fi network;
   establishing a second connection to the Wi-Fi network in accordance with the second set of Wi-Fi parameters; and
   determining whether to maintain the secure Bluetooth connection based at least on a radio frequency band on which the Wi-Fi network operates or a Bluetooth connection between the computing device and a device other than the vehicle accessory system.

9. The at least one non-transitory computer readable storage medium of claim 8, wherein the steps further include, in response to detecting that (i) the Wi-Fi network operates using a 2.4 GHz radio frequency band, and (ii) the computing device is not communicating, via Bluetooth, with any other computing device aside from the vehicle accessory system:
   terminating the secure Bluetooth connection.

10. The at least one non-transitory computer readable storage medium of claim 9, wherein the steps further include, in response to detecting that the second connection to the Wi-Fi network is inactive:
    initializing the secure Bluetooth connection.

11. The at least one non-transitory computer readable storage medium of claim 8, wherein the steps further include, in response to detecting that (i) the Wi-Fi network operates using a 5 GHz radio frequency band, or (ii) the computing device is communicating, via Bluetooth, with another computing device aside from the vehicle accessory system:
    maintaining the secure Bluetooth connection.

12. The at least one non-transitory computer readable storage medium of claim 8, wherein the steps further include, subsequent to establishing the second connection to the Wi-Fi network:
    wirelessly streaming, to the vehicle accessory system over the Wi-Fi network, a user interface (UI) that is generated by the computing device, wherein the vehicle accessory system utilizes at least a portion of the UI to generate an output on a display device that is communicably coupled to the vehicle accessory system.

13. The at least one non-transitory computer readable storage medium of claim 12, wherein the UI differs from a primary UI displayed on a second display device that is communicably coupled to the computing device.

14. The at least one non-transitory computer readable storage medium of claim 13, wherein the UI includes at least one icon corresponding to an application hosted on the computing device.

15. A computing device configured to communicate with a vehicle accessory system, the computing device comprising:
    at least one processor; and
    at least one memory storing instructions that, when executed by the at least one processor, cause the computing device to perform steps that include:
       determining that a first connection to a Wi-Fi network provided by the vehicle accessory system using a first set of Wi-Fi parameters failed and/or disconnected;
       establishing a secure Bluetooth connection with the vehicle accessory system;
       receiving, over the secure Bluetooth connection and from the vehicle accessory system, a second set of Wi-Fi parameters associated with the Wi-Fi network;
       establishing a second connection to the Wi-Fi network in accordance with the second set of Wi-Fi parameters; and
       determining whether to maintain the secure Bluetooth connection based at least on a radio frequency band on which the Wi-Fi network operates or a Bluetooth connection between the computing device and a device other than the vehicle accessory system.

16. The computing device of claim 15, wherein the at least one processor further causes the computing device to perform steps that include, in response to detecting that (i) the Wi-Fi network operates using a 2.4 GHz radio frequency band, and (ii) the computing device is not communicating, via Bluetooth, with any other computing device aside from the vehicle accessory system:
   terminating the secure Bluetooth connection.

17. The computing device of claim 16, wherein the at least one processor further causes the computing device to perform steps that include, in response to detecting that the second connection to the Wi-Fi network is inactive:
   initializing the secure Bluetooth connection.

18. The computing device of claim 15, wherein the at least one processor further causes the computing device to perform steps that include, in response to detecting that (i) the Wi-Fi network operates using a 5 GHz radio frequency band, or (ii) the computing device is communicating, via Bluetooth, with another computing device aside from the vehicle accessory system:
   maintaining the secure Bluetooth connection.

19. The computing device of claim 15, wherein the at least one processor further causes the computing device to perform steps that include, subsequent to establishing the second connection to the Wi-Fi network:
   wirelessly streaming, to the vehicle accessory system over the Wi-Fi network, a user interface (UI) that is generated by the computing device, wherein the vehicle accessory system utilizes at least a portion of the UI to generate an output on a display device that is communicably coupled to the vehicle accessory system.

20. The computing device of claim 19, wherein the UI differs from a primary UI displayed on a second display device that is communicably coupled to the computing device.

* * * * *